United States Patent
Oshima et al.

(10) Patent No.: US 12,512,242 B2
(45) Date of Patent: Dec. 30, 2025

(54) MULTILAYER COIL COMPONENT

(71) Applicant: TDK CORPORATION, Tokyo (JP)

(72) Inventors: Yuya Oshima, Tokyo (JP); Kenji Komorita, Tokyo (JP); Takehiro Ishii, Tokyo (JP); Kouichi Kakuda, Tokyo (JP); Shigeshi Osawa, Yurihonjo (JP); Yusaku Abe, Tokyo (JP); Tsubasa Ozawa, Tokyo (JP); Midori Kishimoto, Tokyo (JP); Makoto Yoshino, Tokyo (JP); Koki Ito, Tokyo (JP); Masato Kudou, Yurihonjo (JP)

(73) Assignee: TDK CORPORATION, Tokyo (JP)

( * ) Notice: Subject to any disclaimer, the term of this patent is extended or adjusted under 35 U.S.C. 154(b) by 675 days.

(21) Appl. No.: 17/992,292

(22) Filed: Nov. 22, 2022

(65) Prior Publication Data

US 2023/0170117 A1  Jun. 1, 2023

(30) Foreign Application Priority Data

Nov. 30, 2021  (JP) ................. 2021-194216

(51) Int. Cl.
*H01F 5/00*   (2006.01)
*H01F 5/04*   (2006.01)

(52) U.S. Cl.
CPC .............. *H01F 5/003* (2013.01); *H01F 5/04* (2013.01)

(58) Field of Classification Search
CPC .......... H01F 5/003; H01F 5/04; H01F 27/292; H01F 17/0013; H01F 2017/002
USPC ................................................. 336/225, 200
See application file for complete search history.

(56) References Cited

U.S. PATENT DOCUMENTS

| | | | |
|---|---|---|---|
| 2007/0296536 A1 | 12/2007 | Odahara et al. | |
| 2014/0333407 A1* | 11/2014 | Otsubo | H01F 27/2804 336/200 |
| 2020/0253464 A1* | 8/2020 | Flower | A61B 17/3423 |
| 2022/0310305 A1* | 9/2022 | Kazuta | H01F 27/292 |

FOREIGN PATENT DOCUMENTS

| | | | |
|---|---|---|---|
| JP | H06-060114 U | 8/1994 | |
| JP | 2001-176725 A | 6/2001 | |
| JP | 2003297633 A * | 10/2003 | |
| JP | 2005-109099 A | 4/2005 | |
| JP | 2007-134568 A | 5/2007 | |
| JP | 2016100344 A * | 5/2016 | |
| JP | 2018-041866 A | 3/2018 | |
| WO | 2007/037097 A1 | 4/2007 | |
| WO | WO-2008018187 A1 * | 2/2008 | ............. H01F 38/40 |

* cited by examiner

*Primary Examiner* — Shawki S Ismail
*Assistant Examiner* — Joselito S. Baisa
(74) *Attorney, Agent, or Firm* — Oliff PLC

(57) ABSTRACT

In a multilayer coil component, a plurality of coil conductors are stacked in a coil axis direction. A connecting conductor connects the coil conductors adjacent to each other in the coil axis direction. First, second, and third coil conductors are arranged in order in the coil axis direction. A main body portion extends in a circumferential direction of the coil axis. Pad portions are connected to the main body portion, are connected to the first coil conductor via the connecting conductor, overhang from the third coil conductor in a direction away from the coil axis when viewed from the coil axis direction, and are inclined with respect to a virtual plane orthogonal to the coil axis direction.

8 Claims, 5 Drawing Sheets

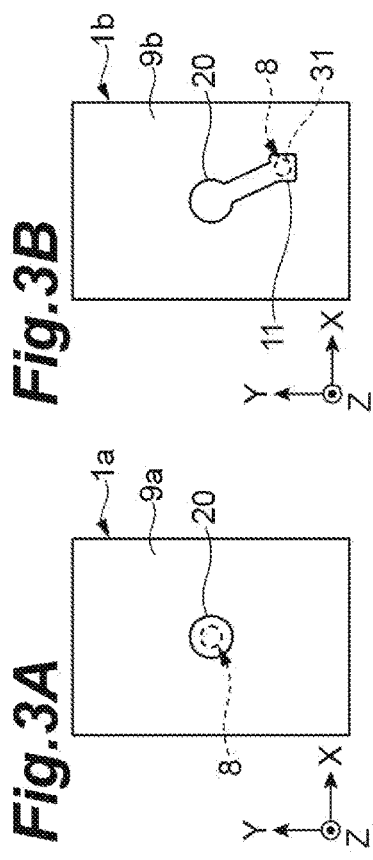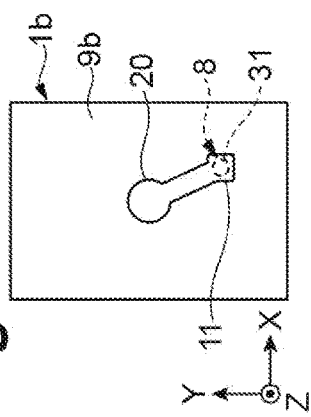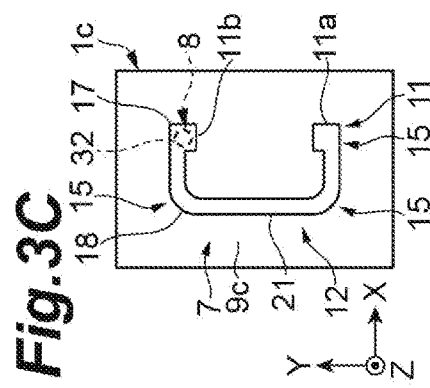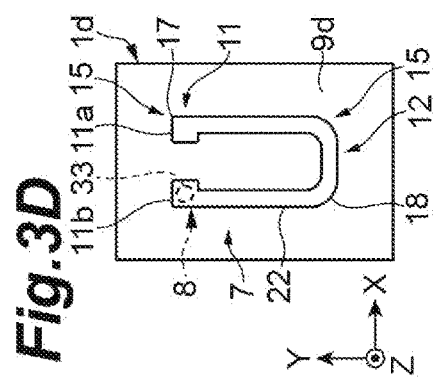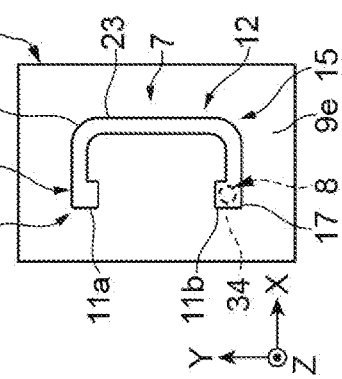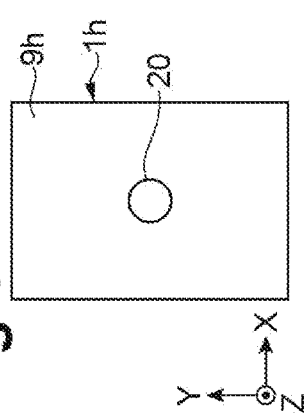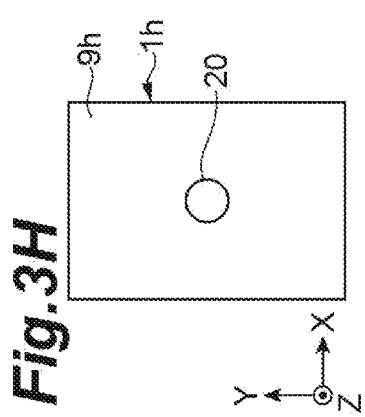

*Fig.4*
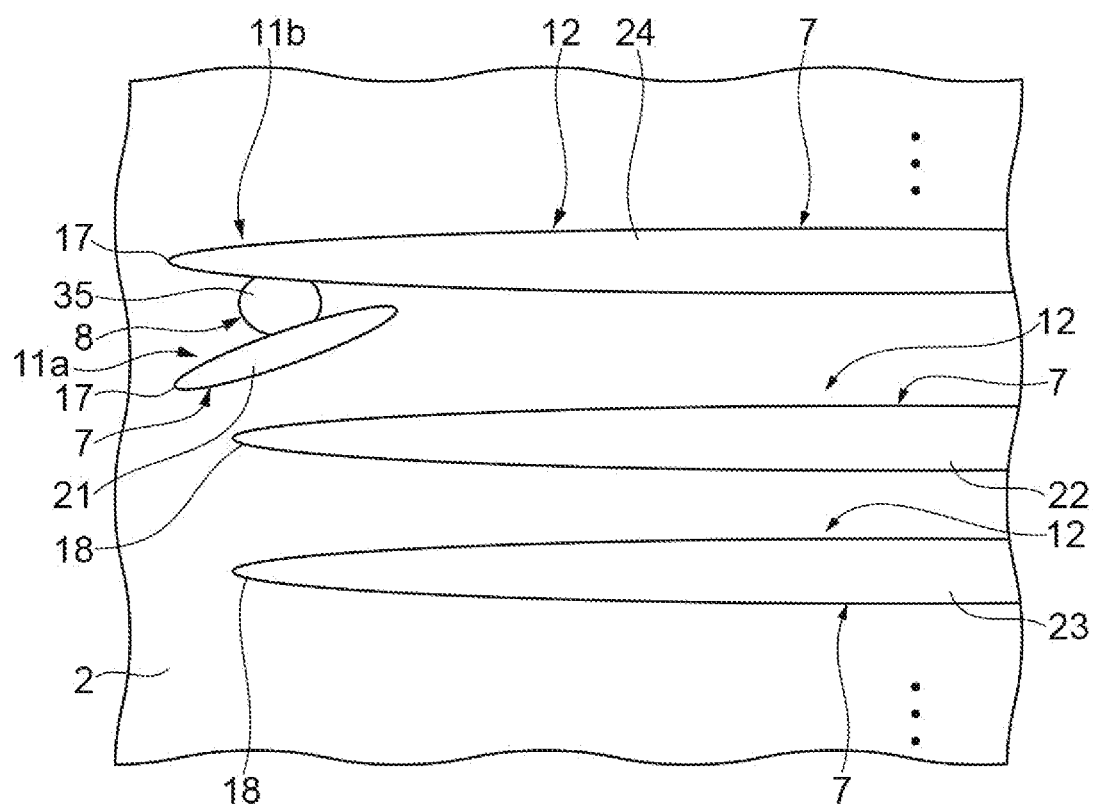
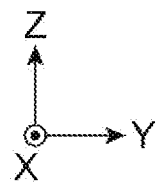

MULTILAYER COIL COMPONENT

TECHNICAL FIELD

The present invention relates to a multilayer coil component.

BACKGROUND

A known multilayer coil component includes an element body and a coil disposed in the element body (for example, Japanese Unexamined Utility Model Publication No. H06-060114). In Japanese Unexamined Utility Model Publication No. H06-060114, the coil has a coil axis extending in a predetermined direction. The coil includes a plurality of coil conductors and a connecting conductor connecting the coil conductors that are adjacent to each other. The plurality of coil conductors are stacked in the coil axis direction and define the inner circumference of the coil when viewed from the coil axis direction. The plurality of coil conductors include pad portions in contact with the connecting conductor and main body portions connected to the pad portions and extending in the circumferential direction of the coil axis.

In the multilayer coil component having the configuration described above, it is conceivable to ensure the area of the pad portion in contact with the connecting conductor so as to ensure the reliability of electrical connection between the pad portion and the connecting conductor. However, it becomes increasingly difficult for the multilayer coil component to have a desired configuration as the area of the pad portion increases.

For example, in making the multilayer coil component compact, reducing the distance between the side surface of the element body and the coil conductor in the coil axis direction is also considered. In this case, designing the distance between the side surface of the element body and the coil conductor without considering manufacturing tolerances may result in pad portion exposure from the side surface of the element body during manufacturing. The inner diameter of the coil is reduced if simply the distance between the side surface of the element body and the coil conductor is increased in order to prevent the pad portion from being exposed from the side surface of the element body. In a case where the pad portion overhangs to the coil axis side when viewed from the coil axis direction as in Japanese Unexamined Utility Model Publication No. H06-060114, the inner diameter of the coil is reduced by the amount of overhanging of the pad portion. The characteristics of the coil are related to the inner diameter of the coil and change if the inner diameter of the coil is reduced.

SUMMARY

An object of one aspect of the present invention is to provide a multilayer coil component in which desired characteristics can be realized in a coil while ensuring the reliability of electrical connection of a coil conductor and making the multilayer coil component compact at the same time.

A multilayer coil component in one aspect of the present invention includes an element body and a coil. The coil is disposed in the element body. The coil has a coil axis extending in a predetermined direction. The coil includes a plurality of coil conductors and at least one connecting conductor. The plurality of coil conductors are stacked in a coil axis direction. The at least one connecting conductor connects the coil conductors adjacent to each other in the coil axis direction. The plurality of coil conductors include first, second, and third coil conductors. The first, second, and third coil conductors have mutually overlapping regions when viewed from the coil axis direction and are arranged in order in the coil axis direction. The second coil conductor includes a main body portion and a pad portion. The main body portion extends in a circumferential direction of the coil axis. The pad portion is connected to the main body portion, is connected to the first coil conductor via the connecting conductor, overhangs from the third coil conductor in a direction away from the coil axis when viewed from the coil axis direction, and is inclined with respect to a virtual plane orthogonal to the coil axis direction.

In this multilayer coil component, the pad portion included in the second coil conductor overhangs from the third coil conductor in the direction away from the coil axis when viewed from the coil axis direction and is inclined with respect to the virtual plane orthogonal to the coil axis direction. In this case, it is possible to ensure both the area of the pad portion in contact with the connecting conductor and the distance between a side surface of the element body and the coil conductor while suppressing a decrease in the inner diameter of the coil. If both the area of the pad portion in contact with the connecting conductor and the distance between the side surface of the element body and the coil conductor are ensured, it is possible to ensure the reliability of electrical connection of the coil conductor and make the multilayer coil component compact at the same time. Accordingly, it is possible to realize desired characteristics in the coil while ensuring the reliability of electrical connection of the coil conductor and making the multilayer coil component compact at the same time.

In the above aspect, a part of the pad portion of the second coil conductor may be included in the region of the third coil conductor when viewed from the coil axis direction. In this case, it is possible to realize desired characteristics in the coil while making the multilayer coil component more compact.

In the above aspect, the second coil conductor may further include a pad portion connected to the third coil conductor via the connecting conductor. In this case, the pad portion connected to the first coil conductor in the second coil conductor overhangs from the third coil conductor connected in another pad portion. In this case, the disposition space of the connecting conductor connecting the first coil conductor and the second coil conductor can be ensured while the multilayer coil component is made more compact.

In the above aspect, the pad portion connected to the first coil conductor and the pad portion connected to the third coil conductor may be disposed at line-symmetrical or point-symmetrical positions in the multilayer coil component when viewed from the coil axis direction. In this case, the coil can be stably disposed in the multilayer coil component. Manufacturing yield can be improved in this structure.

In the above aspect, the coil may include a plurality of pad portions respectively in contact with the connecting conductors different from each other and including the pad portion of the second coil conductor. The plurality of pad portions may be disposed at line-symmetrical or point-symmetrical positions in the multilayer coil component when viewed from the coil axis direction. In this case, the coil can be stably disposed in the multilayer coil component. Manufacturing yield can be improved in this structure.

In the above aspect, a width of the pad portion may be larger than a width of the main body portion. In this case, a decrease in the inner diameter of the coil can be further suppressed while the area of the pad portion in contact with the connecting conductor is ensured.

In the above aspect, the plurality of coil conductors may be disposed in a ring shape having a plurality of corners when viewed from the coil axis direction. The pad portion may form one of the plurality of corners.

In the above aspect, the pad portion of the second coil conductor may overlap the corner of the third coil conductor. A radius of curvature of the corner formed by the pad portion of the second coil conductor may be smaller than a radius of curvature of the part of the third coil conductor overlapping the pad portion of the second coil conductor when viewed from the coil axis direction. In this case, the area of the pad portion in contact with the connecting conductor can be ensured and a decrease in the inner diameter of the coil can be suppressed with greater ease.

One aspect of the present invention provides the multilayer coil component in which desired characteristics can be realized in the coil while ensuring the reliability of electrical connection of the coil conductor and making the multilayer coil component compact at the same time.

BRIEF DESCRIPTION OF THE DRAWINGS

FIGS. 3A to 3H are diagrams illustrating some of a plurality of layers configuring the multilayer coil component.

FIG. 4 is a partial cross-sectional view of the multilayer coil component.

DETAILED DESCRIPTION

Figure 1:
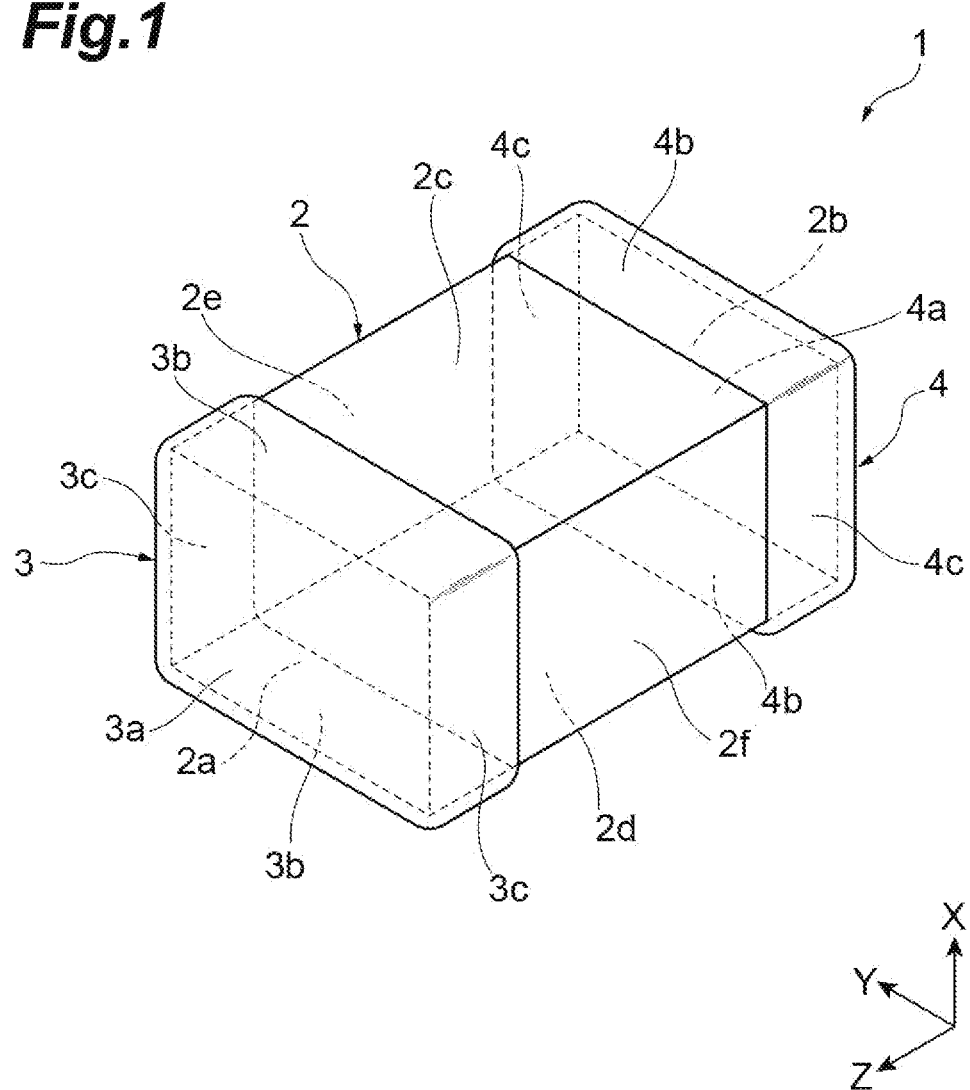
FIG. 1 is a perspective view of a multilayer coil component in the present embodiment.

Hereinafter, an embodiment of the present invention will be described in detail with reference to the accompanying drawings. In the description of the drawings, the same reference numerals are used for the same or equivalent elements with redundant description omitted.

First, a schematic configuration of a multilayer coil component 1 in the present embodiment will be described with reference to FIGS. 1 to 4. FIG. 1 is a perspective view of the multilayer coil component 1 in the present embodiment. The X-axis direction, the Y-axis direction, and the Z-axis direction are mutually intersecting directions. The multilayer coil component in the present embodiment is formed by stacking a plurality of layers in the Z-axis direction. The interlayer boundaries are integrated to the extent that the boundaries cannot be visually recognized. In the present embodiment, the X-axis direction, the Y-axis direction, and the Z-axis direction are mutually orthogonal.

As illustrated in FIG. 1, the multilayer coil component 1 includes an element body 2 and external electrodes 3 and 4. For example, in a case where the external electrode 3 is a first external electrode, the external electrode 4 corresponds to a second external electrode. The multilayer coil component 1 is, for example, solder-mounted in an electronic device. The electronic device includes, for example, a circuit board or an electronic component. In the present embodiment, the element body 2 is formed by a plurality of element body layers stacked in the Z-axis direction.

The element body 2 has, for example, insulating properties. The element body 2 is configured by, for example, a magnetic material. The magnetic material contains, for example, at least one selected from a Ni—Cu—Zn-based ferrite material, a Ni—Cu—Zn—Mg-based ferrite material, and a Ni—Cu-based ferrite material. The magnetic material configuring the element body 2 may contain a Fe alloy or the like. The element body 2 may be configured from a non-magnetic material. The non-magnetic material contains, for example, at least one selected from a glass ceramic material and a dielectric material.

The element body 2 has, for example, a rectangular parallelepiped shape. The rectangular parallelepiped shape includes a rectangular parallelepiped shape with chamfered corner and ridge portions and a rectangular parallelepiped shape with rounded corner and ridge portions. The shape of the element body 2 is not limited to the rectangular parallelepiped shape. For example, the element body 2 may have a columnar shape.

The element body 2 has, as the outer surfaces thereof, a pair of end surfaces 2a and 2b, a pair of side surfaces 2c and 2d, and a pair of side surfaces 2e and 2f. For example, the area of each of the side surfaces 2e and 2f is larger than the area of any of the end surface 2a, the end surface 2b, the side surface 2c, and the side surface 2d. For example, each of the pair of end surfaces 2a and 2b, the pair of side surfaces 2c and 2d, and the pair of side surfaces 2e and 2f is flat.

The pair of end surfaces 2a and 2b face each other in the Z-axis direction. The pair of side surfaces 2c and 2d face each other in the X-axis direction. The pair of side surfaces 2e and 2f face each other in the Y-axis direction. The element body 2 is, for example, shorter in the X-axis direction and in the Y-axis direction than in the Z-axis direction. The element body 2 is, for example, shorter in the X-axis direction than in the Z-axis direction and the Y-axis direction. The length ratio of the element body 2 in the X-axis direction, the Y-axis direction, and the Z-axis direction is not limited thereto. The Z-axis direction is, for example, the longitudinal direction.

The pair of external electrodes 3 and 4 are separated from each other and disposed on the outer surface of the element body 2. The pair of external electrodes 3 and 4 face each other in the Z-axis direction. The pair of external electrodes 3 and 4 are separated from each other in the Z-axis direction.

The pair of external electrodes 3 and 4 are formed by a known technique. The pair of external electrodes 3 and 4 are configured from, for example, a metal material. The metal material is, for example, copper, silver, gold, nickel, or chromium. The pair of external electrodes 3 and 4 are formed by, for example, plating electrode layers. The electrode layer consists of, for example, a conductive paste. The conductive paste is applied by, for example, a dip method, a printing method, or a transfer method. The plating treatment is, for example, electroplating or electroless plating. A plating layer is formed on the outer surface of the conductive paste as a result of this plating treatment.

The external electrode 3 includes, for example, parts 3a, 3b, and 3c. The part 3a of the external electrode 3 is provided on the end surface 2a. The part 3b of the external electrode 3 is provided on the pair of side surfaces 2c and 2d. The part 3c of the external electrode 3 is provided on the pair of side surfaces 2e and 2f. The part 3a of the external electrode 3 covers, for example, the entire end surface 2a. The parts 3b and 3c of the external electrode 3 cover, for example, a part of the pair of side surfaces 2c and 2d and a part of the pair of side surfaces 2e and 2f. The part 3a of the external electrode 3 is connected to the parts 3b and 3c of the external electrode 3.

On each of the side surfaces 2c and 2d, the region covered with the part 3b of the external electrode 3 has, for example, a rectangular shape. On each of the side surfaces 2e and 2f, the region covered with the part 3c of the external electrode 3 has, for example, a rectangular shape. In this specification, "connection" means connection in a direct contact state. "Direct contact" means interconnection without interposing another member illustrated in this specification. "Direct contact" does not exclude connection via a member not specified in this specification.

The external electrode 4 includes, for example, parts 4a, 4b, and 4c. The part 4a of the external electrode 4 is provided on the end surface 2b. The part 4b of the external electrode 4 is provided on the pair of side surfaces 2c and 2d. The part 4c of the external electrode 4 is provided on the pair of side surfaces 2e and 2f. The part 4a of the external electrode 4 covers, for example, the entire end surface 2b. The parts 4b and 4c of the external electrode 4 cover, for example, a part of the pair of side surfaces 2c and 2d and a part of the pair of side surfaces 2e and 2f. The part 4a of the external electrode 4 is connected to the parts 4b and 4c of the external electrode 4. On each of the side surfaces 2c and 2d, the region covered with the part 4b of the external electrode 4 has, for example, a rectangular shape. On each of the side surfaces 2e and 2f, the region covered with the part 4c of the external electrode 4 has, for example, a rectangular shape.

Figure 2:
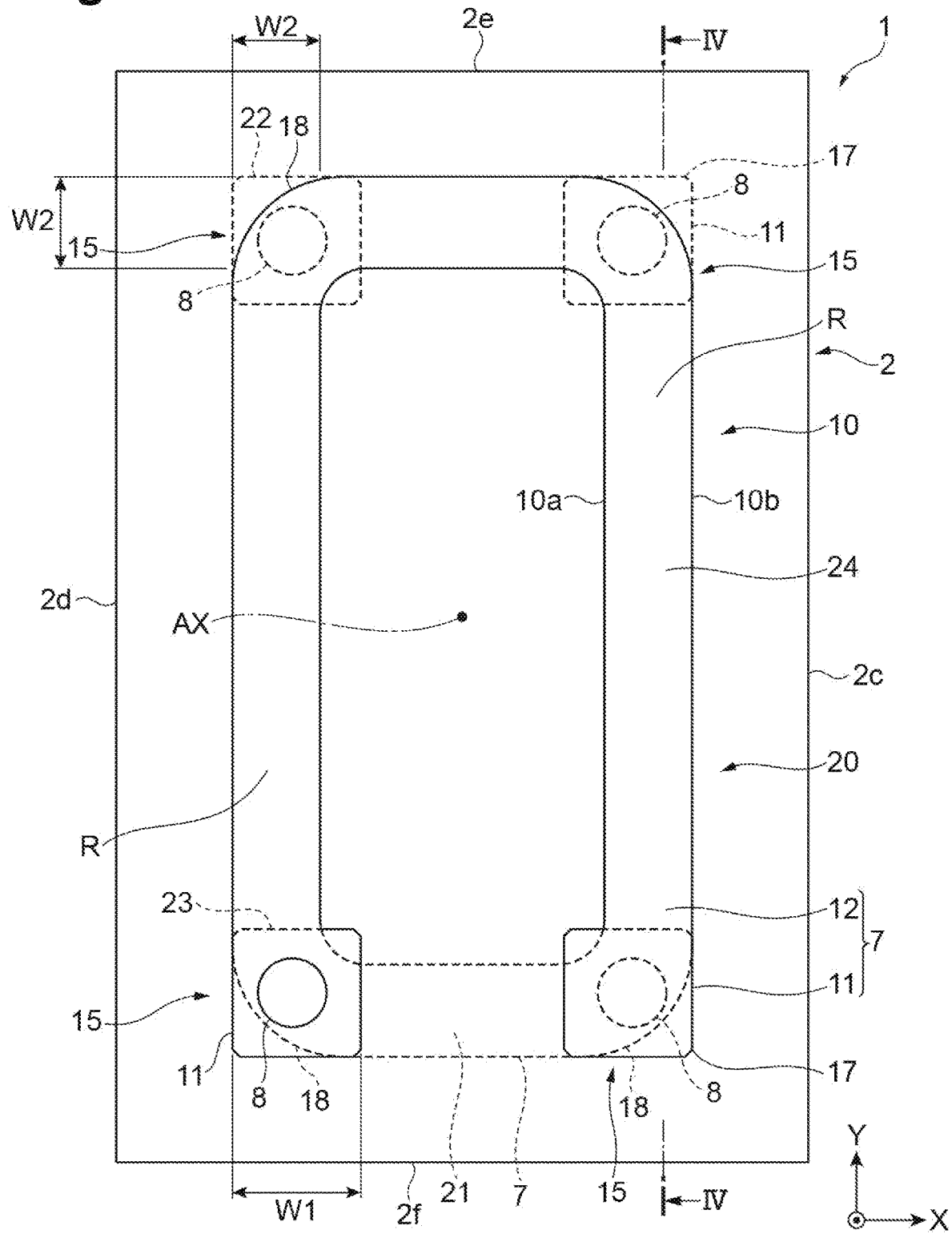
FIG. 2 is a cross-sectional view of the multilayer coil component.
Figure 5A:
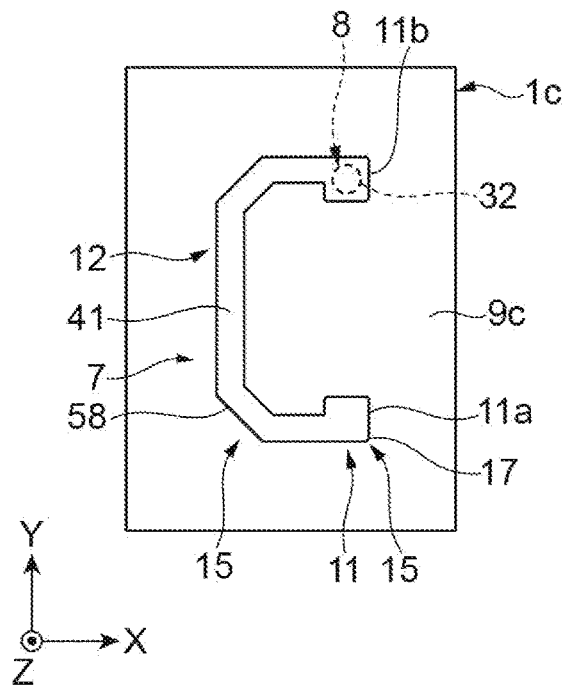
FIGS. 5A to 5D are diagrams illustrating some of a plurality of layers configuring a multilayer coil component in a modification example of the present embodiment.
Figure 5B:
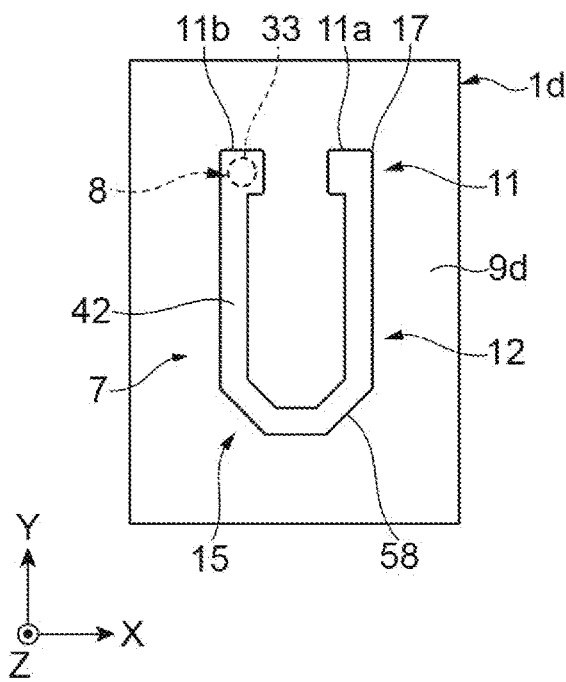
Figure 5C:
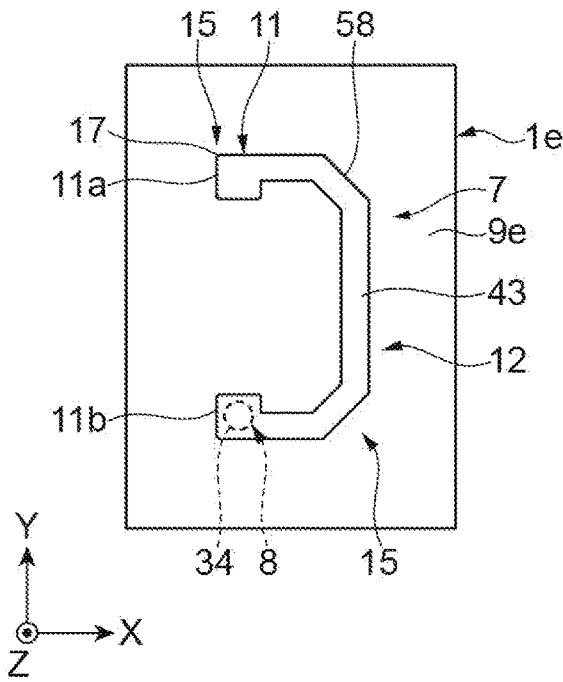
Figure 5D:
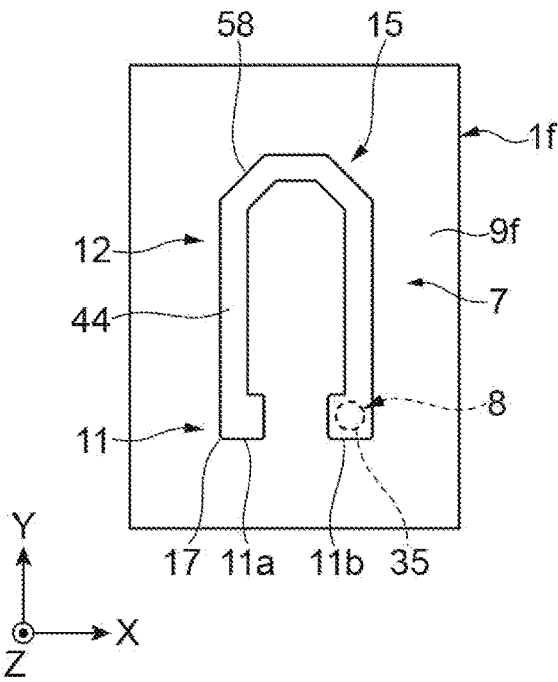

The multilayer coil component 1 further includes a coil 10 disposed in the element body 2 as illustrated in FIGS. 2, 3A to 3H, and 4. The coil 10 has a coil axis AX extending in the Z-axis direction. In other words, the Z-axis direction corresponds to the coil axis direction. FIG. 2 is a cross-sectional view of the multilayer coil component in a plane parallel to the XY-axis plane. FIGS. 3A to 3H illustrate some of the plurality of layers configuring the multilayer coil component 1. FIG. 4 is a cross-sectional view of the multilayer coil component in a plane parallel to the YZ-axis plane. The position of the cross section illustrated in FIG. 4 corresponds to the position of the cross section of the multilayer coil component 1 taken along line IV-IV illustrated in FIG. 2.

The coil 10 includes a plurality of coil conductors 7 and one or more connecting conductors 8. The coil conductor 7 corresponds to an internal conductor layer. The connecting conductor 8 is, for example, a via. For example, the coil 10 is formed by the plurality of coil conductors 7 and the plurality of connecting conductors 8. The coil 10 electrically connects the external electrode 3 and the external electrode 4. In other words, the pair of external electrodes 3 and 4 are electrically connected to each other via the plurality of coil conductors 7. At least two of the plurality of connecting conductors 8 included in the coil 10 overlap when viewed from the Z-axis direction. In this specification, "overlapping" means having a region of mutual overlapping and includes a case of overlapping only in part.

As illustrated in FIG. 2, the plurality of coil conductors 7 are stacked in the Z-axis direction. The connecting conductor 8 penetrates the element body 2 positioned between a pair of the coil conductors 7 and connects the pair of coil conductors 7 adjacent to each other in the Z-axis direction. The plurality of coil conductors 7 are electrically interconnected via the plurality of connecting conductors 8. The plurality of coil conductors 7 and the plurality of connecting conductors 8 are configured by a conductive material. The conductive material contains, for example, at least one selected from Ag and Pd.

The plurality of coil conductors 7 define an inner circumference 10a and an outer circumference 10b of the coil 10 when viewed from the Z-axis direction. At least two of the plurality of coil conductors 7 included in the coil 10 have mutually overlapping regions when viewed from the Z-axis direction. In the present embodiment, each coil conductor 7 includes a pad portion 11 and a main body portion 12. The main body portion 12 extends in the circumferential direction of the coil axis AX. The pad portion 11 and the main body portion 12 included in the same coil conductor 7 are connected to each other.

The pad portion 11 and the connecting conductor 8 are in contact with each other. A first pad portion 11 is connected to a second pad portion 11 of a second coil conductor 7 adjacent to a first coil conductor 7 including the first pad portion 11 via the connecting conductor 8. The first pad portion 11 only partially overlaps the main body portion 12 of the second coil conductor 7 adjacent to the first coil conductor 7 including the first pad portion 11 when viewed from the Z-axis direction. The first pad portion 11 overhangs from the second coil conductor 7 adjacent to the first coil conductor 7 including the first pad portion 11 in the direction away from the coil axis AX when viewed from the Z-axis direction. The first pad portion 11 includes an overhanging part overhanging from the second coil conductor 7 adjacent to the first coil conductor 7 including the first pad portion 11 in the direction away from the coil axis AX and an overlapping part overlapping the second coil conductor 7 adjacent to the first coil conductor 7 including the first pad portion 11 when viewed from the Z-axis direction. When viewed from the Z-axis direction, the length by which the first pad portion 11 overhangs from the second coil conductor 7 adjacent to the first coil conductor 7 in the direction away from the coil axis AX exceeds the length by which the first pad portion 11 overhangs from the second coil conductor 7 adjacent to the first coil conductor 7 in the direction toward the coil axis AX.

As illustrated in FIG. 4, at least one of the plurality of pad portions 11 included in the coil 10 is inclined with respect to a virtual plane orthogonal to the Z-axis direction. Hereinafter, the pad portion inclined with respect to the virtual plane orthogonal to the Z-axis direction will also be referred to as "inclined pad portion". The "virtual plane" corresponds to the XY-axis plane. For example, a first pad portion 11 inclined with respect to this virtual plane is inclined away from a second pad portion 11 connected to the first pad portion 11 via the connecting conductor 8 in the Z-axis direction as the distance from the coil axis AX increases. For example, the first pad portion 11 is inclined such that the overhanging part of the first pad portion 11 is further away from the second pad portion 11 connected to the first pad portion 11 via the connecting conductor 8 than the overlapping part of the first pad portion 11.

The plurality of coil conductors 7 are, for example, disposed in a ring shape having a plurality of corners 15 when viewed from the Z-axis direction. In other words, the plurality of coil conductors 7 have polygonal inner and outer circumferences when viewed from the Z-axis direction. When viewed from the Z-axis direction, the element body 2 surrounded by the plurality of coil conductors 7 has a polygonal shape. In the configuration illustrated in FIG. 2, the plurality of coil conductors 7 are disposed in a ring shape having four corners 15 when viewed from the Z-axis direction, and the element body 2 surrounded by the plurality of coil conductors 7 has a rectangular shape when viewed from the Z-axis direction. In the present embodiment, the pad portion 11 forms one of the plurality of corners 15. The inclined pad portion forms one of the plurality of corners 15. The main body portion 12 forms at least one of the plurality of corners 15.

In the present embodiment, the corner 15 of each coil conductor 7 is curved. A corner 17 formed by the pad portion 11 is curved. A corner 18 formed by the main body portion 12 is curved. The pad portion 11 overlaps the corner 18. In the pad portion 11 and the main body portion 12 mutually overlapping when viewed from the Z-axis direction, the corner 17 overhangs from the corner 18 in the direction away from the coil axis AX. The radius of curvature of the corner 17 formed by the pad portion 11 is smaller than the radius of curvature of the corner 15 formed by the main body portion 12. For example, a first pad portion 11 is inclined such that the corner 17 of the first pad portion 11 is further away from a second pad portion 11 connected to the first pad portion 11 via the connecting conductor 8 in the Z-axis direction than a part of the first pad portion 11 positioned closer to the coil axis AX than the corner 17.

A width W1 of the pad portion 11 is greater than a width W2 of the main body portion 12. The width W1 of the pad portion 11 is the length of the pad portion 11 in the width direction. The width W2 of the main body portion 12 is the length of the main body portion 12 in the width direction. The width direction is, for example, a direction orthogonal to the extension direction in which each coil conductor 7 extends and the Z-axis direction. The extension direction in which each coil conductor 7 extends is a direction in which the main body portion 12 of each coil conductor 7 is continuous. In other words, each of the width W1 of the pad portion 11 and the width W2 of the main body portion 12 is a length in the direction orthogonal to the direction in which the coil conductor 7 is continuous in the minute region of the coil conductor 7 viewed from the Z-axis direction.

In the present embodiment, each coil conductor 7 includes a pair of the pad portions 11 connected to both ends of the main body portion 12. The pair of pad portions 11 include a pad portion 11a and a pad portion 11b. Each of the pad portion 11a and the pad portion 11b is in contact with the connecting conductor 8. Of the plurality of coil conductors 7, the pad portions 11a and the pad portions 11b of the coil conductors 7 adjacent to each other in the Z-axis direction are connected to each other by the connecting conductor 8. The main body portion 12 is connected to the pair of pad portions 11a and 11b included in one coil conductor 7. The pad portion 11a is connected to one end of the main body portion 12, and the pad portion 11b is connected to the other end of the main body portion 12.

The pad portions 11a and 11b have, for example, a rectangular shape when viewed from the Z-axis direction. The "rectangular shape" also includes a shape with a rounded corner or a shape with a chamfered corner. The pad portions 11a and 11b may not be rectangular. As a modification example of the present embodiment, the pad portions 11a and 11b may, for example, have a circular shape when viewed from the Z-axis direction.

Of the plurality of pad portions 11 included in the coil 10, the pad portions 11 in contact with different connecting conductors 8 are disposed at, for example, line-symmetrical or point-symmetrical positions in the multilayer coil component 1 when viewed from the Z-axis direction. In the present embodiment, the pad portion 11a and the pad portion 11b included in the same coil conductor 7 are disposed at line-symmetrical or point-symmetrical positions in the multilayer coil component 1 when viewed from the Z-axis direction.

Next, the structure of the coil 10 will be described in more detail with reference to FIGS. 3A to 3H. As illustrated in FIGS. 3A to 3H, the multilayer coil component 1 includes a plurality of layers 1a, 1b, 1c, 1d, 1e, 1f, 1g, and 1h. Each of the layers 1a to 1h has a rectangular shape in plan view. The thickness direction of each of the layers 1a to 1h corresponds to the Z-axis direction. In the multilayer coil component 1, the layer 1a, the layer 1b, the layer 1c, the layer 1d, the layer 1e, and the layer 1f are stacked in order from the end surface 2a side. Further, in the multilayer coil component 1, the layer 1c, the layer 1d, the layer 1e, the layer 1f, the layer 1g, and the layer 1h are stacked in order from the end surface 2a side. For example, the multilayer coil component 1 is formed by stacking three layers 1a, one layer 1b, a plurality of sets consisting of the layers 1c, 1d, 1e, and 1f, one layer 1g, and three layers 1h in order from the end surface 2a side. For example, in the multilayer coil component 1, thirteen sets consisting of the layers 1c, 1d, 1e, and 1f are stacked repeatedly. With this configuration, the coil 10 has a helical structure that proceeds counterclockwise along the coil axis AX in the +Z-axis direction.

The multilayer coil component 1 includes a plurality of internal terminal layers 20 in addition to the element body 2, the plurality of coil conductors 7, and the plurality of connecting conductors 8. The internal terminal layer 20 is an internal conductor disposed in the element body 2 and is formed by, for example, the same material as the coil conductor 7 and the connecting conductor 8.

The element body 2 configures a part of the plurality of layers 1a to 1h. The element body 2 includes a plurality of element body layers 9a to 9h stacked in the Z-axis direction. The plurality of element body layers 9a to 9h are, for example, ceramic sheets. The element body 2 is formed by, for example, heat-treating a plurality of stacked green sheets. The heat treatment temperature is, for example, approximately 850 to 900° C.

The plurality of coil conductors 7 include mutually separated coil conductors 21, 22, 23, and 24. The plurality of coil conductors 21, 22, 23, and 24 are arranged in the order of the coil conductor 21, the coil conductor 22, the coil conductor 23, and the coil conductor 24 in the Z-axis direction. The plurality of coil conductors 21, 22, 23, and 24 are disposed so as to mutually overlap when viewed from the Z-axis direction. In other words, the plurality of coil conductors 21, 22, 23, and 24 have regions R mutually overlapping when viewed from the Z-axis direction. In a case where the coil conductor 24 corresponds to a first coil conductor, the coil conductor 21 corresponds to a second coil conductor and the coil conductor 22 corresponds to a third coil conductor.

At least one connecting conductor 8 includes mutually separated connecting conductors 31, 32, 33, 34, and 35. The connecting conductor 31 connects the pad portion 11 of the internal terminal layer 20 of the layer 1b and the pad portion 11a of the coil conductor 21. The connecting conductor 32 connects the pad portion 11b of the coil conductor 21 and the pad portion 11a of the coil conductor 22. The connecting conductor 33 connects the pad portion 11b of the coil conductor 22 and the pad portion 11a of the coil conductor 23. The connecting conductor 34 connects the pad portion 11b of the coil conductor 23 and the pad portion 11a of the coil conductor 24. The connecting conductor 35 connects the pad portion 11b of the coil conductor 24 and the pad portion 11 of the internal terminal layer 20 of the layer 1g in a case where the layer 1f is adjacent to the layer 1g. The connecting conductor 35 connects the pad portion 11b of the coil conductor 24 and the pad portion 11a of the coil conductor 21 in a case where the layer 1f is adjacent to the layer 1c.

In the present embodiment, at least one connecting conductor 8 includes a plurality of the connecting conductors 32, a plurality of the connecting conductors 33, a plurality of the connecting conductors 34, and a plurality of the connecting conductors 35. For example, the connecting conductors 32, 33, 34, and 35 are disposed so as to respectively overlap the connecting conductors 32, 33, 34, and 35 connected to coil conductors having the same pattern and disposed at different positions when viewed from the Z-axis direction. For example, the plurality of connecting conductors 33 are connected to the coil conductors 22 having the same pattern and disposed at different positions and are disposed so as to mutually overlap when viewed from the Z-axis direction. The connecting conductor 31 and the connecting conductor 35 are disposed so as to mutually overlap when viewed from the Z-axis direction.

The plurality of coil conductors 7 configure a part of the plurality of layers 1c to 1f. The plurality of internal terminal layers 20 configure a part of the plurality of layers 1a, 1b, 1g, and 1h. The plurality of coil conductors 7 and the plurality of internal terminal layers 20 are stacked in the Z-axis direction. The plurality of connecting conductors 8 connect the coil conductors 7 or the internal terminal layers 20 in the mutually adjacent layers 1a to 1h.

In each of the layers 1a to 1h, the coil conductor 7 and the internal terminal layer 20 are surrounded by the element body layers 9a to 9h when viewed from the Z-axis direction. In the mutually adjacent layers 1a to 1h, the coil conductors 7 and the internal terminal layers 20 are disposed so as to mutually overlap at least in part when viewed from the Z-axis direction. The coil conductor 7 and the internal terminal layer 20 are disposed apart from the end surfaces 2a and 2b, the side surfaces 2c and 2d, and the side surfaces 2e and 2f.

In the multilayer coil component 1, the layer 1a is configured by the element body layer 9a and the internal terminal layer 20. The element body layer 9a is provided with a missing portion that has a shape corresponding to the shape of the internal terminal layer 20 and into which the internal terminal layer 20 is fitted. In the layer 1a, the internal terminal layer 20 has, for example, a circular shape when viewed from the Z-axis direction.

In the multilayer coil component 1, the layer 1b is configured by the element body layer 9b and the internal terminal layer 20. The element body layer 9b is provided with a missing portion that has a shape corresponding to the shape of the internal terminal layer 20 and into which the internal terminal layer 20 is fitted. In the layer 1b, the internal terminal layer 20 includes the pad portion 11 as in the case of the coil conductor 7. In the layer 1b, the internal terminal layer 20 extends in a direction intersecting the X axis and the Y axis in the XY-axis plane. One end of the internal terminal layer 20 of the layer 1b is connected to the internal terminal layer 20 of the layer 1a via the connecting conductor 8. The pad portion 11 is disposed at the other end of the internal terminal layer 20 of the layer 1b. The pad portion 11 of the internal terminal layer 20 in the layer 1b overlaps the pad portion 11a of the coil conductor 21, the pad portion 11b of the coil conductor 24, and the pad portion 11 of the internal terminal layer 20 in the layer 1g when viewed from the Z-axis direction. A part of the pad portion 11 of the internal terminal layer 20 in the layer 1b overlaps the main body portions 12 of the coil conductors 22 and 23 when viewed from the Z-axis direction. In other words, a part of the pad portion 11 of the internal terminal layer 20 in the layer 1b is included in the region R of the coil conductors 22 and 23 when viewed from the Z-axis direction.

In the multilayer coil component 1, the layer 1c is configured by the element body layer 9c and the coil conductor 21. The element body layer 9c is provided with a missing portion that has a shape corresponding to the shape of the coil conductor 21 and into which the coil conductor 21 is fitted. The main body portion 12 of the coil conductor 21 has a U shape open in the +X-axis direction when viewed from the Z-axis direction. In the coil conductor 21, the pad portion 11a and the pad portion 11b are arranged in order in the +Y-axis direction and connected to both ends of the main body portion 12. The pad portion 11a of the coil conductor 21 is connected to the pad portion 11 of the layer 1b via the connecting conductor 31.

The pad portion 11a of the coil conductor 21 overlaps the pad portion 11 of the internal terminal layer 20 in the layer 1b, the pad portion 11b of the coil conductor 24, and the pad portion 11 of the internal terminal layer 20 in the layer 1g when viewed from the Z-axis direction. A part of the pad portion 11a of the coil conductor 21 overlaps the main body portions 12 of the coil conductors 22 and 23 when viewed from the Z-axis direction. In other words, a part of the pad portion 11a of the coil conductor 21 is included in the region R of the coil conductors 22 and 23 when viewed from the Z-axis direction. A part of the pad portion 11b of the coil conductor 21 overlaps the main body portions 12 of the coil conductors 23 and 24 when viewed from the Z-axis direction. In other words, a part of the pad portion 11b of the coil conductor 21 is included in the region R of the coil conductors 23 and 24 when viewed from the Z-axis direction.

The pad portion 11a of the coil conductor 21 overlaps the corner 18 of the coil conductor 22 when viewed from the Z-axis direction. The radius of curvature of the corner 17 formed by the pad portion 11a of the coil conductor 21 is smaller than the radius of curvature of the corner 18 overlapping the pad portion 11a of the coil conductor 21 in the coil conductor 22 when viewed from the Z-axis direction. The pad portion 11b of the coil conductor 21 overlaps the corner 18 of the coil conductor 24 when viewed from the Z-axis direction. The radius of curvature of the corner 17 formed by the pad portion 11b of the coil conductor 21 is smaller than the radius of curvature of the corner 18 overlapping the pad portion 11b of the coil conductor 21 in the coil conductor 24 when viewed from the Z-axis direction.

In the multilayer coil component 1, the layer 1d is configured by the element body layer 9d and the coil conductor 22. The element body layer 9d is provided with a missing portion that has a shape corresponding to the shape of the coil conductor 22 and into which the coil conductor 22 is fitted. The main body portion 12 of the coil conductor 22 has a U shape open in the +Y-axis direction when viewed from the Z-axis direction. In the coil conductor 22, the pad portion 11a and the pad portion 11b are arranged in order in the —X-axis direction and connected to both ends of the main body portion 12. The pad portion 11a of the coil conductor 22 is connected to the pad portion 11b of the layer 1c via the connecting conductor 32.

The pad portion 11a of the coil conductor 22 overlaps the pad portion 11b of the coil conductor 21 when viewed from the Z-axis direction. A part of the pad portion 11a of the coil conductor 22 overlaps the main body portions 12 of the coil conductors 23 and 24 when viewed from the Z-axis direction. In other words, a part of the pad portion 11a of the coil conductor 22 is included in the region R of the coil conductors 23 and 24 when viewed from the Z-axis direction. A part of the pad portion 11b of the coil conductor 22 overlaps the main body portions 12 of the coil conductors 21 and 24 when viewed from the Z-axis direction. In other words, a part of the pad portion 11b of the coil conductor 22 is included in the region R of the coil conductors 21 and 24 when viewed from the Z-axis direction.

The pad portion 11a of the coil conductor 22 overlaps the corner 18 of the coil conductor 23 when viewed from the Z-axis direction. The radius of curvature of the corner 17 formed by the pad portion 11a of the coil conductor 22 is smaller than the radius of curvature of the corner 18 overlapping the pad portion 11a of the coil conductor 22 in the coil conductor 23 when viewed from the Z-axis direction. The pad portion 11b of the coil conductor 22 overlaps the corner 18 of the coil conductor 21 when viewed from the Z-axis direction. The radius of curvature of the corner 17 formed by the pad portion 11b of the coil conductor 22 is smaller than the radius of curvature of the corner 18 overlapping the pad portion 11b of the coil conductor 22 in the coil conductor 21 when viewed from the Z-axis direction.

In the multilayer coil component 1, the layer 1e is configured by the element body layer 9e and the coil conductor 23. The element body layer 9e is provided with a missing portion that a shape corresponding to the shape of the coil conductor 23 and into which the coil conductor 23 is fitted. The main body portion 12 of the coil conductor 23 has a U shape open in the —X-axis direction when viewed from the Z-axis direction. In the coil conductor 23, the pad portion 11a and the pad portion 11b are arranged in order in the —Y-axis direction and connected to both ends of the main body portion 12. The pad portion 11a of the coil conductor 23 is connected to the pad portion 11b of the layer 1d via the connecting conductor 33.

The pad portion 11a of the coil conductor 23 overlaps the pad portion 11b of the coil conductor 22 when viewed from the Z-axis direction. A part of the pad portion 11a of the coil conductor 23 overlaps the main body portions 12 of the coil conductors 21 and 24 when viewed from the Z-axis direction. In other words, a part of the pad portion 11a of the coil conductor 23 is included in the region R of the coil conductors 21 and 24 when viewed from the Z-axis direction. A part of the pad portion 11b of the coil conductor 23 overlaps the main body portions 12 of the coil conductors 21 and 22 when viewed from the Z-axis direction. In other words, a part of the pad portion 11b of the coil conductor 23 is included in the region R of the coil conductors 21 and 22 when viewed from the Z-axis direction.

The pad portion 11a of the coil conductor 23 overlaps the corner 18 of the coil conductor 24 when viewed from the Z-axis direction. The radius of curvature of the corner 17 formed by the pad portion 11a of the coil conductor 23 is smaller than the radius of curvature of the corner 18 overlapping the pad portion 11a of the coil conductor 23 in the coil conductor 24 when viewed from the Z-axis direction. The pad portion 11b of the coil conductor 23 overlaps the corner 18 of the coil conductor 22 when viewed from the Z-axis direction. The radius of curvature of the corner 17 formed by the pad portion 11b of the coil conductor 23 is smaller than the radius of curvature of the corner 18 overlapping the pad portion 11b of the coil conductor 23 in the coil conductor 22 when viewed from the Z-axis direction.

In the multilayer coil component 1, the layer if is configured by the element body layer 9f and the coil conductor 24. The element body layer 9f is provided with a missing portion that a shape corresponding to the shape of the coil conductor 24 and into which the coil conductor 24 is fitted. The main body portion 12 of the coil conductor 24 has a U shape open in the —Y-axis direction when viewed from the Z-axis direction. In the coil conductor 24, the pad portion 11a and the pad portion 11b are arranged in order in the +X-axis direction and connected to both ends of the main body portion 12. The pad portion 11a of the coil conductor 24 is connected to the pad portion 11b of the layer 1e via the connecting conductor 34.

The pad portion 11a of the coil conductor 24 overlaps the pad portion 11b of the coil conductor 23 when viewed from the Z-axis direction. A part of the pad portion 11a of the coil conductor 24 overlaps the main body portions 12 of the coil conductors 21 and 22 when viewed from the Z-axis direction. In other words, a part of the pad portion 11a of the coil conductor 24 is included in the region R of the coil conductors 21 and 22 when viewed from the Z-axis direction. A part of the pad portion 11b of the coil conductor 24 overlaps the main body portions 12 of the coil conductors 22 and 23 when viewed from the Z-axis direction. In other words, a part of the pad portion 11b of the coil conductor 24 is included in the region R of the coil conductors 22 and 23 when viewed from the Z-axis direction.

The pad portion 11a of the coil conductor 24 overlaps the corner 18 of the coil conductor 21 when viewed from the Z-axis direction. The radius of curvature of the corner 17 formed by the pad portion 11a of the coil conductor 24 is smaller than the radius of curvature of the corner 18 overlapping the pad portion 11a of the coil conductor 24 in the coil conductor 21 when viewed from the Z-axis direction. The pad portion 11b of the coil conductor 24 overlaps the corner 18 of the coil conductor 23 when viewed from the Z-axis direction. The radius of curvature of the corner 17 formed by the pad portion 11b of the coil conductor 24 is smaller than the radius of curvature of the corner 18 overlapping the pad portion 11b of the coil conductor 24 in the coil conductor 23 when viewed from the Z-axis direction.

In the multilayer coil component 1, the layer 1g is configured by the element body layer 9g and the internal terminal layer 20. The element body layer 9g is provided with a missing portion that has a shape corresponding to the shape of the internal terminal layer 20 and into which the internal terminal layer 20 is fitted. In the layer 1g, the internal terminal layer 20 includes the pad portion 11 as in the case of the coil conductor 7. In the layer 1g, the internal terminal layer 20 extends in a direction intersecting the X axis and the Y axis in the XY-axis plane. The pad portion 11 is disposed at one end of the internal terminal layer 20 of the layer 1g, and this pad portion 11 is connected to the pad portion 11b of the layer if via the connecting conductor 35. The pad portion 11 of the internal terminal layer 20 in the layer 1g overlaps the pad portion 11a of the coil conductor 21, the pad portion 11b of the coil conductor 24, and the pad portion 11 of the internal terminal layer 20 in the layer 1b when viewed from the Z-axis direction. A part of the pad portion 11 of the internal terminal layer 20 in the layer 1g overlaps the main body portions 12 of the coil conductors 22 and 23 when viewed from the Z-axis direction. In other words, the pad portion 11 of the internal terminal layer 20 in the layer 1g is included in the region R of the coil conductors 22 and 23 when viewed from the Z-axis direction.

In the multilayer coil component 1, the layer 1h is configured by the element body layer 9h and the internal terminal layer 20. The element body layer 9h is provided with a missing portion that has a shape corresponding to the shape of the internal terminal layer 20 and into which the internal terminal layer 20 is fitted. In the layer 1h, the internal terminal layer 20 has, for example, a circular shape when viewed from the Z-axis direction. The internal terminal layer 20 of the layer 1h is connected to the pad portion 11 of the layer 1g via the connecting conductor 8.

FIG. 4 is a cross-sectional view of the multilayer coil component 1 that is cut parallel to the YZ-axis plane so as to pass through the connecting conductor 35. In the configuration illustrated in FIG. 4, the pad portion 11b of the coil conductor 21 overhangs from the coil conductor 22 in the —Y-axis direction away from the coil axis AX when viewed from the Z-axis direction. When viewed from the Z-axis direction, the length by which the pad portion 11 of the coil conductor 21 overhangs from the coil conductor 23 in the direction away from the coil axis AX exceeds the length by which the pad portion 11 of the coil conductor 21 overhangs from the coil conductor 23 in the direction toward the coil axis AX. The pad portion 11a of the coil conductor 21 is inclined with respect to a virtual plane orthogonal to the Z-axis direction. In FIG. 4, the pad portion 11b of the coil conductor 24 connected to the pad portion 11a of the coil conductor 21 via the connecting conductor 35 extends along the virtual plane orthogonal to the Z-axis direction.

As a modification example of the configuration illustrated in FIG. 4, the pad portion 11a of the coil conductor 24 connected to the pad portion 11a of the coil conductor 21 via the connecting conductor 35 may be inclined with respect to a virtual plane orthogonal to the Z-axis direction. In this modification example, the pad portion 11a of the coil conductor 21 may extend along the virtual plane orthogonal to the Z-axis direction. Both the pad portion 11a and the pad portion 11b connected to each other by the connecting conductor 35 may be inclined with respect to a virtual plane orthogonal to the Z-axis direction. The pad portions 11 of the coil conductors 22, 23, and 24 may have the same configuration.

Next, a multilayer coil component according to a modification example of the present embodiment will be described with reference to FIGS. 5A to 5D. FIGS. 5A to 5D are diagrams illustrating some of the plurality of layers that configure the multilayer coil component in the modification example of the present embodiment. This modification example is generally similar or identical to the multilayer coil component 1 described above. This modification example differs from the above embodiment in terms of the shapes of the coil conductors 7 in the layers 1c to 1f. The difference from the multilayer coil component 1 described above will be mainly described below. FIGS. 5A to 5D respectively illustrate the layers 1c to if corresponding to the layers illustrated in FIGS. 3C to 3F.

In this modification example, the plurality of coil conductors 7 include mutually separated coil conductors 41, 42, 43, and 44. The coil conductors 41, 42, 43, and 44 correspond to the coil conductors 21, 22, 23, and 24, respectively. Each of the coil conductors 41, 42, 43, and 44 includes, as the corner 15, the corner 17 formed by the pad portion 11 and a corner 58 formed by the main body portion 12. The corner 58 has a chamfered shape. The corner 58 has a linear shape extending in a direction inclined with respect to the X axis and the Y axis when viewed from the Z-axis direction. In other words, the corner 58 has a linear shape extending in a direction inclined with respect to the X axis and the Y axis in the XY-axis plane.

Next, the actions and effects of the multilayer coil component 1 in the present embodiment and the modification example will be described. In the multilayer coil component 1, the pad portion 11 of the coil conductor 7 overhangs from another coil conductor 7 in the direction away from the coil axis AX when viewed from the Z-axis direction and is inclined with respect to a virtual plane orthogonal to the Z-axis direction.

For example, in the multilayer coil component 1, the pad portion 11 of the coil conductor 21 overhangs from the coil conductor 23 in the direction away from the coil axis AX when viewed from the Z-axis direction and is inclined with respect to a virtual plane orthogonal to the Z-axis direction. In this case, it is possible to ensure both the area of the pad portion 11 in contact with the connecting conductor 8 and the distance between the coil conductor 7 and the end surfaces 2a and 2b and the side surfaces 2e and 2f of the element body 2 while suppressing a decrease in the inner diameter of the coil 10. If both the area of the pad portion 11 in contact with the connecting conductor 8 and the distance between the coil conductor 7 and the end surfaces 2a and 2b and the side surfaces 2e and 2f of the element body 2 are ensured, it is possible to ensure the reliability of electrical connection of the coil conductor 7 and make the multilayer coil component 1 compact. Accordingly, it is possible to realize desired characteristics in the coil 10 while ensuring the reliability of electrical connection of the coil conductor 7 and making the multilayer coil component 1 compact.

Stress is locally applied in a case where the plurality of coil conductors 7 and the plurality of connecting conductors 8 overlap in the Z-axis direction. As a result, the element body may crack. According to the configuration described above, stress can be dispersed and cracking of the element body 2 can be suppressed.

For example, a part of the pad portion 11 of the coil conductor 21 overlaps the coil conductor 22 when viewed from the Z-axis direction. In other words, a part of the pad portion 11 of the coil conductor 21 is included in the region R of the coil conductor 22 when viewed from the Z-axis direction. In this case, it is possible to realize desired characteristics in the coil 10 while making the multilayer coil component 1 more compact.

For example, the coil 10 includes the plurality of pad portions 11 respectively in contact with the mutually different connecting conductors 8. The plurality of pad portions 11 are disposed at line-symmetrical or point-symmetrical positions in the multilayer coil component 1 when viewed from the Z-axis direction. For example, the pad portion 11a connected to the coil conductor 24 and the pad portion 11b connected to the coil conductor 22 are disposed at line-symmetrical or point-symmetrical positions in the multilayer coil component 1 when viewed from the Z-axis direction. In these cases, the coil can be stably disposed in the multilayer coil component. For example, stacking misalignment can be suppressed by force during stacking being evenly applied in a direction orthogonal to the Z-axis direction. Manufacturing yield can be improved with this structure.

For example, the width W1 of the pad portion 11 is greater than the width W2 of the main body portion 12. In this case, a decrease in the inner diameter of the coil 10 can be further suppressed while the area of the pad portion 11 in contact with the connecting conductor 8 is ensured.

The plurality of coil conductors 7 are disposed in a ring shape having the plurality of corners 15 when viewed from the Z-axis direction. The pad portion 11 forms one of the plurality of corners 15. In this case, the radius of curvature of the corner 17 formed by the pad portion 11 of the coil conductor 21 is smaller than the radius of curvature of the corner 18 overlapping the pad portion 11 of the coil conductor 21 in the coil conductor 22 when viewed from the Z-axis direction. In this case, the area of the pad portion 11 in contact with the connecting conductor 8 can be ensured and a decrease in the inner diameter of the coil 10 can be suppressed with greater ease.

The present invention is not necessarily limited to the embodiment and the modification example of the present invention described above, and various modifications can be made without departing from the scope thereof.

For example, in the multilayer coil component 1, the plurality of coil conductors 7 had a pattern count of four. However, the plurality of coil conductors 7 may have a pattern count of less than four or five or more.

In the multilayer coil component 1, the pad portion 11 overhangs from another coil conductor 7 also in the direction toward the coil axis AX when viewed from the Z-axis direction. However, the pad portion 11 may not overhang from another coil conductor 7 in the direction toward the coil axis AX.

What is claimed is:

1. A multilayer coil component comprising:
an element body; and
a coil disposed in the element body and having a coil axis extending in a predetermined direction, wherein
the coil includes a plurality of coil conductors stacked in a coil axis direction and at least one connecting conductor connecting the coil conductors adjacent to each other in the coil axis direction,
the plurality of coil conductors include first, second, and third coil conductors having mutually overlapping regions when viewed from the coil axis direction and arranged in order in the coil axis direction, and
the second coil conductor includes
a main body portion extending in a circumferential direction of the coil axis, and
a pad portion connected to the main body portion, connected to the first coil conductor via the connecting conductor, overhanging from the third coil conductor in a direction away from the coil axis when viewed from the coil axis direction, and inclined with respect to a virtual plane orthogonal to the coil axis direction.

2. The multilayer coil component according to claim 1, wherein a part of the pad portion of the second coil conductor is included in the region of the third coil conductor when viewed from the coil axis direction.

3. The multilayer coil component according to claim 1, wherein the second coil conductor further includes a pad portion connected to the third coil conductor via the connecting conductor.

4. The multilayer coil component according to claim 3, wherein the pad portion connected to the first coil conductor and the pad portion connected to the third coil conductor are disposed at line-symmetrical or point-symmetrical positions in the multilayer coil component when viewed from the coil axis direction.

5. The multilayer coil component according to claim 1, wherein
the coil includes a plurality of pad portions respectively in contact with the connecting conductors different from each other and including the pad portion of the second coil conductor, and
the plurality of pad portions are disposed at line-symmetrical or point-symmetrical positions in the multilayer coil component when viewed from the coil axis direction.

6. The multilayer coil component according to claim 1, wherein a width of the pad portion is larger than a width of the main body portion.

7. The multilayer coil component according to claim 1, wherein
the plurality of coil conductors are disposed in a ring shape having a plurality of corners when viewed from the coil axis direction, and
the pad portion forms one of the plurality of corners.

8. The multilayer coil component according to claim 7, wherein
the pad portion of the second coil conductor overlaps the corner of the third coil conductor, and
a radius of curvature of the corner formed by the pad portion of the second coil conductor is smaller than a radius of curvature of the corner of the third coil conductor overlapping the pad portion of the second coil conductor when viewed from the coil axis direction.

* * * * *